Patented May 24, 1949

2,471,243

UNITED STATES PATENT OFFICE 2,471,243

ALDEHYDE - POLYCYANOACETAMIDO-COMPOUND CONDENSATION PRODUCTS AND THE PROCESS OF MAKING SAME

John B. Rust, West Orange, N. J., assignor, by direct and mesne assignments, of one-half to Montclair Research Corporation, and one-half to Ellis-Foster Company, both corporations of New Jersey No Drawing. Application March 25, 1944, Serial No. 528,163

6 Claims. (Cl. 260—72)

The present invention relates to resinous aldehyde reaction products of polycyanoacetamido-compounds and to the process of making same.

It is an object of this invention to provide resinous compositions which are suitable for use as moldings, castings, lacquers, varnishes and the like.

It is a further object to provide resinous compositions suitable as textile and paper sizing materials.

It is also an object to make available coreaction products of aldehyde-reactable compositions with polycyanoacetamido-compound-aldehyde reaction products.

Other objects and advantages will become apparent from the more detailed description of the invention. Such description should not be taken as limiting but only by way of illustration and explanation, since numerous variations may be made in the process of this invention by those skilled in the art without departing from the spirit and scope thereof.

The process of the present invention comprises reacting an aldehyde with a polycyanoacetamido-hydrocarbon in either acid, basic or neutral conditions. As the aldehyde constituent of the present invention I may use formaldehyde, paraformaldehyde, hexamethylenetetramine, acetaldehyde, butyraldehyde, benzaldehyde, furfuraldehyde, and the like. As the polycyanoacetamido-hydrocarbon constituent, I may use, for example, 1,2-dicyanoacetamidoethane, 1,3-dicyanoacetamidopropane, 1,2-dicyanoacetamidopropane, diethylene tricyanoacetamide, triethylene tetracyanoacetamide, tetraethylene pentacyanoacetamide, p-dicyanocetamidobenzene, hexamethylene dicyanoacetamide, tetramethylene dicyanoacetamide, and the like.

Potentially reactive resins may be made by the process of the present invention by terminating the reaction short of the production of gelled, cured materials. These potentially reactive materials may be used as lacquers, varnishes, or mixed with fillers and molded under heat and pressure. As fillers, I may use asbestos, wood flour, mica, clay, cellulose, glass fibers, canvas, and the like.

The resins and plastics of the present invention may be blended with other resinous products and plastics such as vinyl, methacrylate, acrylate, styrene, cellulose acetate, ethyl cellulose, vinylidene chloride resins, and the like. The resins of this invention may be coreacted with aldehydes and aldehyde-reactable materials such as urea, guanidine, dicyanodiamide, melamine, phenols, ketones, and the like.

In general the polycyanoacetamido compounds which are reacted with aldehydes according to this invention may be represented by:

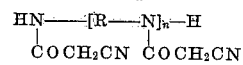

where R is a divalent radical which may be alkylene or arylene and may contain side chains such as alkyl, aryl, alkaryl, aralkyl, carbocyclic, olefinyl groups and the like, and $n$ is a small integer from 1 to 5. When reacted with an aldehyde to form the resinous products of this invention, these may be represented in a general manner by:

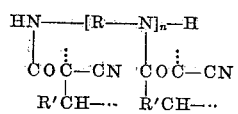

where R'CH represents the radical derived from the aldehyde R'CHO.

The products of the present invention range from resinous viscous liquid to hard, infusible, insoluble materials. The viscous liquids may be permanently fusible or capable of being converted into hard resinous and plastic solids.

The following examples illustrate the products and processes of the present invention. All proportions are in parts by weight.

*Example 1.*—A crude mixture containing mainly N-tetraethylene pentacyanoacetamide was prepared by reaction of 5 moles of ethyl cyanoacetate with 1 mole of tetraethylene pentamine. One mole of this mixture was reacted with 5 moles of formaldehyde. A rapid reaction occurred on heating to give a soft, rubbery gel. Upon heating at 130° C. for 1½ hours a pale brown, transparent resin was secured which withstood the action of boiling water.

*Example 2.*—Triethylene tetracyanoacetamide was made from 1 mole of triethylenetetramine and 4 moles of ethyl cyanoacetate by heating and continuously removing the ethanol which was formed. 8.1 parts of triethylene tetracyanoacetamide were mixed with 6.3 parts of 37% formaldehyde solution. When heated a rapid reaction occurred and a brown resin was formed. This resin could be ground up, mixed with filler and molded under heat and pressure.

*Example 3.*—8.1 parts of triethylene tetracyanoacetamide, 21.2 parts of 37% formaldehyde solution and 16 parts of urea were mixed and heated. A solution of resin was obtained which did not set up to a gel on continued heating. However, on heating in a film to 120° C. a hard brittle resin was secured.

*Example 4.*—Diethylene tricyanoacetamide was prepared from 1 mole of diethylene triamine and 3 moles of ethyl cyanoacetate by heating with continuous removal of the ethanol as it was formed. A brown wax-like solid was obtained. 9.1 parts of diethylene tricyanoacetamide were mixed with 7.2 parts of 37% formaldehyde solution and heated. A rapid reaction occurred with the production of a reddish brown rubbery resin.

*Example 5.*—Dipropylene tricyanoacetamide was prepared as was the ethylene analog of Example 4. 10 parts of dipropylene tricyanoacetamide were mixed with 7.2 parts of 37% formaldehyde solution and heated to 90° C. for 20 minutes. A red brown insoluble, infusible resin was formed.

*Example 6.*—Dicyanoacetamidoneopentane was formed by the reaction of 2 moles of ethyl cyanoacetate with 1 mole of diaminoneopentene. 9.8 parts of dicyanoacetamidoneopentane were mixed and heated with 7.2 parts of 37% formaldehyde solution. A viscous resinous solution was formed which formed a hard brittle resin when dehydrated.

I claim:

1. A resinous condensation product of an aldehyde and a polycyanoacetamide compound of the formula

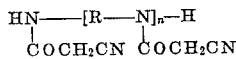

where R is a divalent hydrocarbon radical selected from the group consisting of alkylene and arylene radicals having from two to six carbon atoms and $n$ is a number from 1 to 5.

2. A resinous condensation product of formaldehyde and a polycyanoacetamide compound of the formula $$HN\text{---}[R\text{---}N]_n\text{---}H$$
$$\overset{|}{C}OCH_2CN \quad \overset{|}{C}OCH_2CN$$

where R is a divalent hydrocarbon radical selected from the group consisting of alkylene and arylene radicals having from two to six carbon atoms and $n$ is a number from 1 to 5.

3. A resinous condensation product of formaldehyde and tetraethylene pentacyanoacetamide.

4. A resinous condensation product of formaldehyde and triethylene tetracyanoacetamide.

5. A resinous condensation product of formaldehyde and diethylene tricyanoacetamide.

6. The process of making a resinous condensation product which comprises heating an aldehyde and polycyanoacetamide compound of the formula $$HN\text{---}[R\text{---}N]_n\text{---}H$$
$$\overset{|}{C}OCH_2CN \quad \overset{|}{C}OCH_2CN$$

where R is a divalent hydrocarbon radical selected from the group consisting of alkylene and arylene radicals having from two to six carbon atoms and $n$ is a number from 1 to 5.

JOHN B. RUST.

REFERENCES CITED

The following references are of record in the file of this patent:

UNITED STATES PATENTS

| Number | Name | Date |
|---|---|---|
| 2,228,271 | Jacobson | Jan. 14, 1941 |
| 2,239,440 | D'Alelio | Apr. 22, 1941 |
| 2,292,333 | D'Alelio | Aug. 4, 1942 |
| 2,352,070 | Bock | June 20, 1944 |
| 2,367,455 | Bock | Jan. 1, 1945 |